Nov. 9, 1954   J. TATKO   2,693,926
PALLET, PLATFORM OR THE LIKE
Filed March 3, 1954
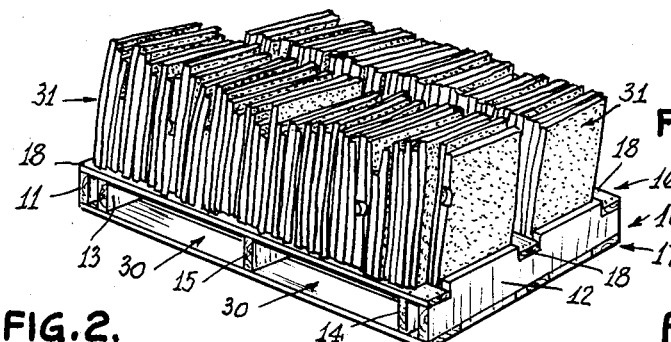
FIG.1.
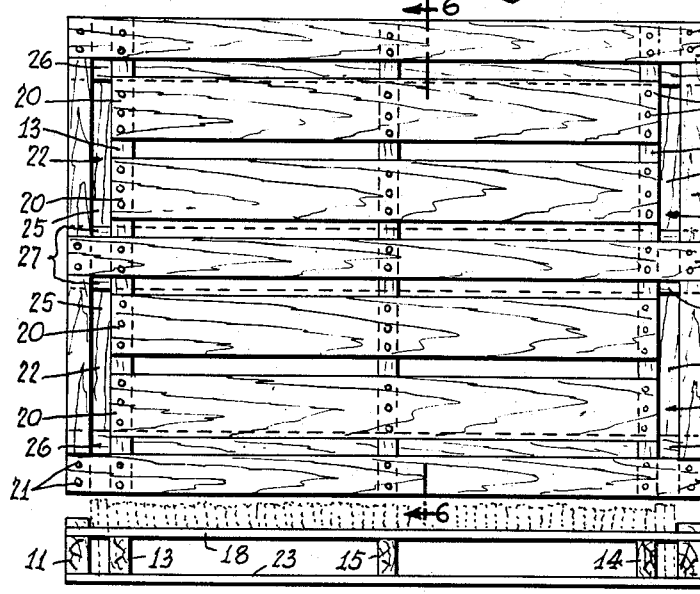
FIG.2.
FIG.3.
FIG.4.
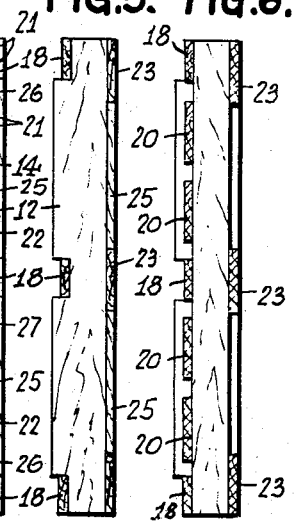
FIG.5. FIG.6.
INVENTOR.
JOHN TATKO
BY
ATTORNEY.

United States Patent Office 2,693,926
Patented Nov. 9, 1954

2,693,926

PALLET, PLATFORM OR THE LIKE

John Tatko, Middle Granville, N. Y., assignor to Tatko Brothers Slate Co. Inc., Middle Granville, N. Y., a corporation of New York Application March 3, 1954, Serial No. 413,941

3 Claims. (Cl. 248—120)

This invention relates to improvements in pallets in general and more particularly to the type employed in the slate products industry for holding, transporting and/or storaging slate items, such as, for example, slabs, flagstones, roofing slates, tilestones, etc.

Slate is a stratified, metamorphic rock which has the property of splitting into thin sheets, and finds its greatest use as roofing and in the manufacture of blackboards, billiard tables, and electrical appliances. Slate is formed when shale or clay is subjected to great pressure and heat in the earth. It occurs in thin, parallel planes which can be easily split into thin sheets and formed or manufactured into slabs or plates.

Flagstone is a fissile or cleavable sandstone which splits up into flags or flat stones used for paving.

A quarry is the place where the stones are dug from the earth or separated from a large mass of rock and hewn, split and squared into slabs, plates or slates for building purposes and construction work. The process is known as quarrying.

In the slate quarry industry, the handling of slate slabs or panels coming from the quarry, storing the same and transporting the same for shipment has aways been a serious handling problem. On account of the weight, differences in sizes and possibility of breakage which is an economic loss, there has been a need for a simplified, efficient and practical handling method.

It is, therefore, an object of the present invention to provide a very practical, efficient and economical slab products pallet or platform capable of overcoming the heretofore existing disadvantages and difficulties in assembling, transporting and storing stone slabs.

It is another object of the present invention to provide a pallet for slate products which is easy to manipulate, and capable of transporting the slate products as desired.

A further object of the present invention resides in the provision of a slate or flagstone products pallet which is adapted for use at the splitting mill where the slate or flagstone is sawed and/or split, or in the yard where the same is made ready for shipment.

Yet another object of the present invention is to provide a pallet whereon the product in the form of roofing slate, flagstone, floor slabs, or the like may be arranged from the conveyor line or yard and remain there ready for delivery from the trailer or other instrumentality of transportation to the point of destination, the pallet thus, not only functioning as a carrier but also as a storage means until the material is used up.

A still further object of the present invention resides in the provision of a pallet having means adapted to receive the raising forks conventional on trucks used for transporting the slate or flagstone.

Another object of the invention is to utilize slate, flagstone or other slabs as end walls for the pallet or platform, slots, cavities or pockets being provided adjacent the ends of the pallet for the reception of such end slabs to act as retaining walls of the pallet.

The above and other objects and advantages will appear from the following disclosure thereof together with the attached drawing which illustrates, by way of example, a preferred form of the invention, and in which, Fig. 1 is a perspective view showing the pallet in accordance with the invention loaded with slate slabs;

Fig. 2 is a top plan view of a pallet according to the invention;

Fig. 3 is a front elevational view thereof, with slabs indicated in broken lines;

Fig. 4 is a bottom view of Fig. 2, partly broken away;

Fig. 5 is an end elevational view taken from the right hand side of Fig. 2; and

Fig. 6 is a section taken on line 6—6 of Fig. 2.

Referring now more particularly to the drawings which show a practical example of realizing the invention, there is illustrated a pallet or platform generally indicated by the numeral 10.

Pallet or platform 10 comprises two end pieces or stringers 11 and 12, intermediate stringers or members 13 and 14, and central stringers or elements 15. The pallet is constructed with two horizontal tiers 16 and 17, upper and lower respectively. The top or upper tier 16 may comprise three planks or boards 18 running the full length of the pallet. Four intermediate planks or boards 20, somewhat wider and shorter than the planks 18 are secured, as by nails 21, to the pieces 13 and 14. Planks 18 are secured, as by nails 21, to the elements 11, 12, 13, 14 and 15. The four planks 20 are also secured, as by nails 21, to element 15 at its center. Since stringers 11 and 13 as well as the stringers 12 and 14 are spaced apart, it can be seen that slots, cavities or pockets 22 are formed for a purpose later on described.

Referring now to Fig. 4, there are again illustrated the stringers or elements 11, 12, and the elements or stringers 13, 14 and 15. Secured to these elements or pieces at their underside are three elongated bottom members or slats 23 running the full length of the pallet. The four spaces between these slats 23 are filled by boards or slats 25. It is understood that instead of nails, other suitable securing means, such as, for example, bolts or screws may be employed; and that the pallet may be constructed of any suitable material other than wood, although it has been found that wood is preferable because of its weight, cost and strength. It is also to be understood that if wood is used, the same may be weatherproofed.

As clearly shown in Fig. 1, spaces 30 are formed in the construction of the pallet, the said spaces 30 being needed for permitting the arms or forks of hoists to enter the pallet for raising, lowering, or moving about the pallet. However, the slots, pockets or cavities 22 formed by adjacent pieces or stringers 11—13, 12—14 run from top to bottom, being stopped at the lower level or bottom by the members 25, also by the shelves 26 and 27 formed by the bottom boards 23 being wider than the top boards 18.

In loading these pallets with slabs of slate, flagstone, or the like, the preferable procedure is to use one or two end slabs 31 and position them in upstanding relation into each of the four pockets 22 and employ them as vertical walls. The number of slabs required to fill the pockets 22 will be determined by the thickness of the slabs so used. After these end walls have been erected, the space thus formed between end walls will then be filled in or stacked side by side with the slabs in substantially vertical position, all as clearly seen in Fig. 1.

It now can be clearly and readily understood that the pallet in one of its practical forms comprises a platform having the spaced upper and lower horizontal tiers 16 and 17, respectively, provided with the transverse slots or pockets 22 adjacent opposite sides, or ends thereof adapted to removably hold upstanding slabs in the form of slate, flagstone, sandstone, or the like providing side or end walls to retain the upstanding intermediate slabs in substantial vertical position when the pallet is stacked with the slabs in side by side relation, the spaces 30 between the platform tiers 16 and 17, providing for the reception of the conventional hoisting forks for raising, lowering or moving about the pallet when loaded.

From the foregoing it is seen that the device of the present invention accomplishes its intended objects and is well adapted to meet practical conditions of use.

Although the present invention has been described in some detail by way of illustration and example for purposes of clarity of understanding, it is understood that certain changes and modifications may be made within the spirit of the invention and the scope of the appended claims.

What is claimed as new and desired to be secured by Letters Patent is:

1. A pallet for supporting a plurality of slabs of slate, flagstone or the like, comprising a substantially rectangular platform consisting of two spaced horizontal tiers, upper and lower, respectively, a pair of stringers spaced apart and extending transversely of the pallet substantially from edge to edge thereof at each opposite end of said pallet forming a pocket therebetween and adapted to be engaged by some of the slabs to maintain the latter in substantially upstanding position, each of said pockets having a transverse slot in said upper tier and a bottom support below said slot provided by a portion of said lower tier, said upper tier including boards extending transversely of the pockets closing the outer ends of the pockets.

2. In a pallet, the combination of a pair of stringers at each opposite end of the pallet and with the stringers of each pair spaced apart transversely forming pockets therebetween, boards secured on opposite sides of the stringers connecting the pair of stringers together and also the stringers of each pair, additional boards on the upper side of the pallet extending between the inner stringers and secured thereto, with the pockets open at the top of the pallet, means for closing each pocket at its opposite ends, and means substantially closing the bottoms of the pockets.

3. In a pallet, the combination of a pair of stringers at each opposite end of the pallet and with the stringers of each pair spaced apart transversely forming pockets therebetween and with each of said stringers extending throughout the width of the pallet, boards secured on opposite sides of the stringers connecting the pairs of stringers together and also the stringers of each pair, said boards at the opposite ends of the pockets closing said ends of the pockets, additional boards at the top of the pallet extending only between the inner stringers of the respective pairs and intermediate the first-mentioned boards, and boards secured to the bottoms of the stringers intermediate the first-mentioned boards substantially closing the bottoms of the pockets.

References Cited in the file of this patent

UNITED STATES PATENTS

| Number | Name | Date |
|---|---|---|
| 607,214 | Carroll | July 12, 1898 |
| 1,773,542 | Munroe | Aug. 19, 1930 |
| 2,471,693 | Lilienfeld | May 31, 1949 |
| 2,539,809 | Buckley | Jan. 30, 1951 |

FOREIGN PATENTS

| Number | Country | Date |
|---|---|---|
| 636,440 | Great Britain | Apr. 26, 1950 |